April 12, 1966 J. RABINOW 3,246,085

METHOD OF MANUFACTURING PHONOGRAPH RECORDS

Filed Nov. 26, 1963

INVENTOR

Jacob Rabinow

BY Joseph A. Genovese & Max L. Libman

ATTORNEYS

United States Patent Office 3,246,085

Patented Apr. 12, 1966

3,246,085
METHOD OF MANUFACTURING PHONOGRAPH RECORDS

Jacob Rabinow, Bethesda, Md., assignor, by mesne assignments, to Jacob Rabinow, Bethesda, Md.

Filed Nov. 26, 1963, Ser. No. 325,845
3 Claims. (Cl. 179—100.1)

This invention relates to methods and means for manufacturing phonograph records, and is particularly concerned with the elimination of distortion originating in conventional record manufacturing and studio playback equipment.

During the course of manufacturing and the playback of phonograph disc records by means of conventional recording and playback equipment, many types of distortions are introduced into the actual manufacture of the record and are also produced by the playback equipment. This is true even if the playback equipment is of the highest quality. For example, the cutter does not perfectly respond to the audio (or other) signals. There is some springback in the material that is being cut. The pressings are not perfect reproductions of the master, and finally, in the production process, the playback stylus is not a duplicate of the cutter so that pinch effects and other distortions are produced. The angle at which the stylus is supported is not necessarily identical to the angle that the cutting stylus is supported, and this is particularly important in stereo records. The material of which records are made is somewhat soft and elastic so that during the more violent acceleration of the stylus, the material deforms and the stylus path is not that which one would expect from perfectly rigid material. Because the reproducing stylus is, of necessity, round while the cutting stylus has sharp edges, the produced wave form does not correspond to that which was fed to the cutter.

The main object of my invention is to produce a record with the best equipment possible; play it back with best available equipment; then play back the record (as made normally) and compare this signal with the master signal which has been previously recorded on material such as magnetic tape. By this comparison I can measure almost all of the distortions which are produced by the whole process of recording and playback. I then make a new recording where these distortions are fed out of phase with the distortions which would normally be produced. Thus, the final recording, to the first order of approximation, has no distortion. I say "to the first order" because my invention does not provide an exact solution because the new signals played back through the system are not identical with the original signal. Therefore, the distortions produced are not identical to the original. They also contain distortions of distortions. If the total distortion of the original was of the order of three percent, the new distortions that were not present originally will be three percent of the original three percent and, for all practical purposes, they can be neglected. In any case, the final reproducing will be far better than if my invention were not used.

Certain distortions and noise cannot be compensated by my technique. Among these, for example, is surface noise which is unique to a particular master or to a particular record being played. Putting this noise back out of phase will not cancel the new noise which has no relation to the old. However, since the noise factors in the modern recording techniques and in modern playback equipment are very low, and because noise does not add directly but as a square root of the sum of the squares, the increase in noise is negligible.

It is obvious that if a present-day record is played by far superior and different equipment at some future time, the distortion correction components may not be quite correct for such later equipment. For example, if future styli are made to have nearly zero mass, the distortion corrections based on present styli would not be quite correct. It is not likely that styli can be made with zero mass and since the development of such equipment proceeds very slowly, and since other factors make records more or less obsolete in ten or twenty year cycles, this is a minor point. But even if styli get lighter and better, the distortion will still be less overall than the distortion from completely uncorrected records.

Recapitulating, in my invention I store the audio signals (constituting the piece to be recorded) in a storage medium with very little distortion, for example, on a magnetic tape of the highest quality. Using the stored audio signals, I make a preliminary record using all of the steps of the conventional record making technique. The preliminary record contains the distortions caused by record making equipment and will produce the normal playback distortions even with the finest pickups. Today these would be the records that are normally produced for sale. My invention includes the additional steps of playing back this normally-produced record and comparing the recorded signals as played back, with the stored audio signals on the tape, and utilizing differences between these signals. This difference represents the distortions caused by the record making and playback equipment. By inverting the above differences and combining them with the original stored audio signal, I now provide a new signal which contains distortion correction components and I use this signal with the same record making techniques to produce my new records.

Another object of my invention is to provide a technique of manufacturing records to minimize the distortions produced by normal or average playback equipment such as from pickups. A feature of my invention is that it automatically compensates for faults in the recording and playback equipment for each particular record. It is well known that some of these faults are unique to the particular amplitudes and frequencies of a particular selection being played. My system compensates for distortions produced by such amplitude and frequency components individually for each record.

Another object of my invention is to provide a method of manufacturing records substantially in accordance with the foregoing procedures.

To my knowledge, no one has approached this problem in a manner similar to my invention, although record making equipment has obviously greatly improved over the years. In addition, there have been efforts to correct specific distortions. For example, the Semi J. Begun Patent No. 2,446,479 discloses a method of correcting phase shift distortion in sound recording systems. There are disclosures of techniques for special-case recording, such as the Kreuzer Patent No. 2,468,210 to reduce surface noise when making a composite record from a number of pre-recordings. The Malinaric Patent No. 2,999,-905 is another special case, disclosing a noise-reduction system to make a new master from a plurality of existing copies. These efforts, as well as others, do not disclose the concept of using the distortions in a record to provide signal components to eliminate the distortions originating in the record manufacturing and playback process.

Other objects and features of importance will become evident as the description proceeds.

*Preface*

Figure 1:
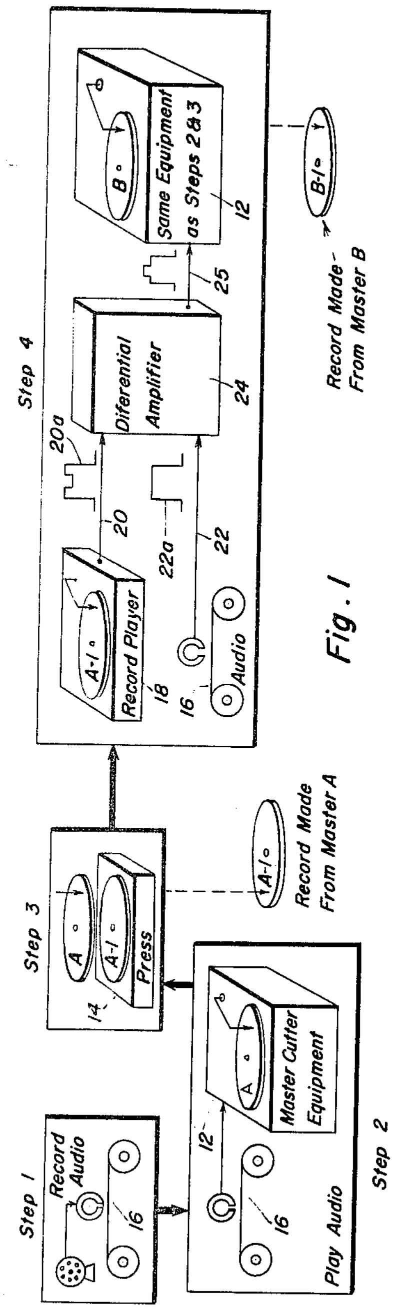
FIGURE 1 is a schematic view showing the steps of my method of making phonograph records.

FIGURE 1 shows a sequence of four steps to produce a record B–1 from master B having the distortions greatly reduced as compared with conventional master making equipment when record masters are manufactured in the customary way. The conventional record making equipment is schematically shown at 12 within the rectangles representing steps Nos. 2 and 4, and at 14 in the box representing step 3. The equipment 12 and 14 customarily includes means to manufacture a master which is an original recording of a composition of music, speech, etc. From the master there is a second record, often called a mother, which is usually made of brass or similar metal having the same information as the master. Equipment 12 and 14 includes a plating device, a press (to manufacture records A–1 which are prepared for sale), and other devices. Being conventional, further details of the record master making equipment 12 and reproduction equipment 14 are not given. However, it is important to understand that records A–1 have distortions which originate from equipment 12, 14. These are the distortions which are either eliminated or greatly reduced by my invention.

*The process in detail*

The first step in my system is to record audio signals by means of a high quality recorder 16 which is capable of more faithfully reproducing the original composition and storing the reproduction (audio signals) than record making equipment 12. A precision magnetic tape recorder fulfills these requirements. My second step is to play the recorded signals into the record master making equipment 12 and produce master A. Step 3 is to make one or more records A–1 from the master A. This record making procedure is schematically represented as press 14 in step 3, although step 3 may be considered a part of step 2 because press 14 is a part of the conventional record making equipment. It is understood that this process includes the usual electroplating and other steps. At this point in my process, record A–1 and all others like it made from master A, will be of the quality governed by the nature of the record manufacturing equipment 12, 14. In other words, records A–1 are the same quality as (and can be) commercially available records.

The final step 4 includes playing record A–1 containing the distortions inherent in the use of equipment 12, 14 by means of a high precision record player 18. The record player 18 is of the best design available at the time that this procedure is followed.

Figure 2:
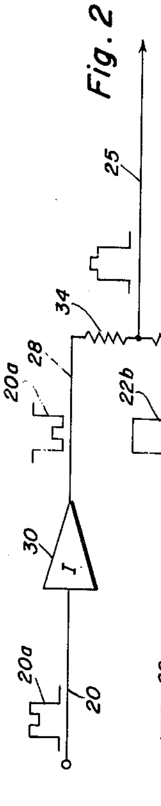
FIGURE 2 is a schematic view illustrating one way to construct an analog computing network used in my record manufacturing procedure.

At the same time that the recorded audio is played from the preliminary record A–1, the originally stored audio signals are again played from the tape recorder 16. Thus, the output line 20 of record player 18 conducts the preliminary audio signals with their distortions, and the undistorted audio signals are conducted on line 22 from tape recorder 16. These signals, as separate inputs, are impressed on an analog computing network 24. The details of one suitable network are shown in FIGURE 2 (described later). The purpose of the analog computing network 24 is to compare the distorted preliminary audio signals on line 20 to the undistorted stored audio signals on line 22, and provide a new signal on line 25 which has distortion components opposite to those produced by the original cycle of record playing. The components are inverted, i.e. they are equal and opposite to the distortions in the preliminary audio signals. Thus, by impressing the new signals on the same record master making equipment 12 as was used in step 2, a new master B is manufactured. However, the new master is distortion-corrected in view of the fact that the same equipment 12 is used in both instances. Now, master B is used to produce records B–1 which do not lead to the distortions originating from the record making and playback equipment.

FIGURE 2 shows analog computing network 24. At left thereof there are two wave forms 20*a* and 22*a*. Wave form 20*a* schematically represents a rather badly distorted audio signal as would occur on line 20, and wave form 22*a* represents the corresponding original audio signal occurring phase on line 22. The signal on line 22 is amplified by amplifier 26 having gain, for instance two-to-one, whereby the amplified true audio signal on the amplifier output line 28 will appear as wave form 22*b*. At the same time, inverting amplifier 30 having no gain (one-to-one) inverts the distorted audio signal on line 20 to provide an output signal on line 32 having a wave form as at 20*b*. The signals on lines 28 and 32 are combined by a conventional mixer 34 whose output line 25 conducts a signal corresponding to the true audio plus components which are equal and opposite to the distortions (differences between wave forms 20*a* and 22*a*) of the original, true audio stored in the tape of recorder 16.

Figure 3:
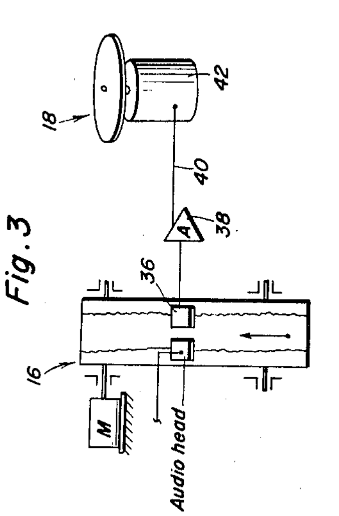
FIGURE 3 is a perspective view showing one means of exactly synchronizing a tape recorder and record player during a portion of my record manufacturing procedure.
Figure 4:
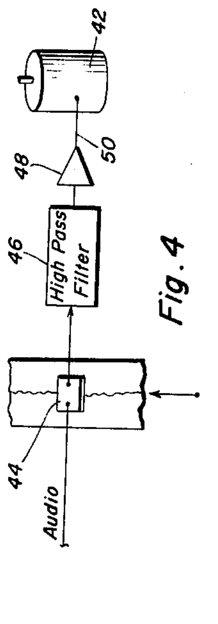
FIGURE 4 is a perspective view of another synchronizing means.

It is necessary to assure that there is no phase shift due to asynchronous operation of recorder 16 and record player 18 (step 4). There are several ways of obtaining this assurance, two of which are shown in FIGURES 3 and 4. Tape recorder 16 (FIGURE 3) has two separate tracks, one for the audio information, and the other having a high frequency signal (e.g. 20 or 30 kc.) recorded thereon. A separate head 36 picks up the high frequency signal and conducts it to an amplifier 38, whose output line 40 is connected to the turntable motor 42 of record player 18. In this way, the turntable rotates as a slave to motion of the magnetic tape which is driven by its independent motor M. The system shown in FIGURE 3 has an advantage over other synchronizing systems because the magnetic tape can have pre-recorded "start" signals or codes which are detected by head 36 (or another head, not shown) to assure starting in coincidence with the first frequency of the signal on line 20. Logic circuits for accomplishing this are not shown since they are common in magnetic tape systems used in digital data processing.

Another method (FIGURE 4) and perhaps the simplest and most satisfactory, of assuring that there will be no phase shift of the signals on lines 20 and 22 is almost identical to that shown in FIGURE 3. Instead of using a separate channel and head for the high frequency control signal, it is superimposed on the audio at the time that the audio is recorded on the tape. As in FIGURE 3, the high frequency signal is used to operate the turntable motor 42 of record player 18. Accordingly, FIGURE 4 shows magnetic playback head 44 having an output line connected to amplifier 48 by means of a high-pass filter 46. The amplifier output line 50 is, in turn, connected with the turntable motor 42 of record player 18.

It is understood that the previous description of an embodiment of my invention is given by way of example only, and that various modifications may be made without departing from the protection of the following claims.

I claim:

1. The method of making a phonograph record master cut disc using conventional record making equipment which inherently produces distortions during the process of record manufacture including playback, said method comprising the steps of (a) recording the true audio signals on a medium having little or no distortions;

(b) playing the recorded audio signals into said equipment to produce a first master disc;

(c) making a preliminary disc record from said first master disc using the usual procedure with said record containing said distortions due to said equipment;

(d) playing said preliminary disc record and said recorded true audio in synchronism using standard playback equipment to provide preliminary record signals and said recorded true audio signals;

(e) computing the differences between and combining said preliminary signals and said recorded true audio signals to provide a new signal having the true audio together with correction signal components equal and opposite to the computed differences; and (f) impressing said new signal on said equipment to produce a distortion-compensating master cut disc.

2. The method of manufacturing a record master cut phonograph disc by using conventional record making equipment, said method comprising storing the true audio signals which form the recording subject matter, making a first cut disc record of said stored audio signals by means of said equipment, playing back the record, comparing the playback signals of said preliminary record with said stored audio signals and inverting the signal differences to provide distortion-correction signal components, combining said signal components with said stored audio signals to provide a new signal containing the audio together with said correction signal components, and making a second cut disc record by means of said equipment while using said distortion-corrected new signals.

3. Method of making a phonograph record master disc using conventional record making equipment which inherently produces distortions due to the process of record manufacture including playback, said method comprising the steps of (a) recording the true audio signals on high-quality tape, (b) playing said tape signals into said equipment to produce a first master cut disc, (c) making a preliminary disc record from said first master disc using the usual procedure with said record containing said distortions due to said equipment, (d) playing said preliminary disc record and said tape record in accurate synchronism, using standard playback equipment, to provide preliminary record signals and said recorded true audio signals, and differentially mixing said synchronized signals in such manner as to produce a resultant signal which includes a true audio signal combined with correction signal components equal and opposite to the differences between said preliminary signals and the true audio signals, (e) playing said new signal into said conventional record making equipment to produce a distortion-compensating master cut disc.

References Cited by the Examiner

UNITED STATES PATENTS

| | | | |
|---|---|---|---|
| 1,909,765 | 5/1933 | Jenkins et al. | 179—100.25 X |
| 2,224,170 | 12/1940 | Van Der Meulen | 179—100.4 |
| 2,685,079 | 7/1954 | Hoeppner | 179—100.1 |
| 2,822,722 | 2/1958 | Kennedy | 179—100.2 X |
| 2,937,241 | 5/1960 | Colbert | 179—100.2 |
| 2,957,953 | 10/1960 | Woodward | 179—100.2 |

FOREIGN PATENTS

| | | |
|---|---|---|
| 888,922 | 2/1962 | Great Britain. |

IRVING L. SRAGOW, *Primary Examiner.*

M. S. GITTES, G. LIEBERSTEIN, *Assistant Examiners.*